Nov. 22, 1949  O. J. HUELSTER  2,489,032
ENVELOPE SNAP FASTENER
Filed July 22, 1944
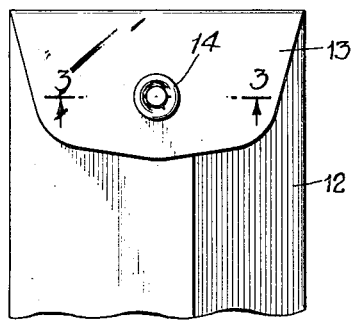
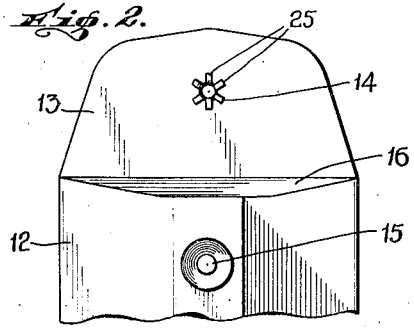
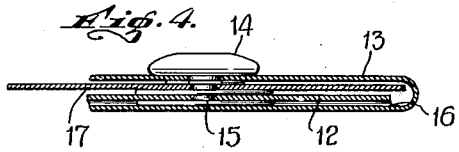
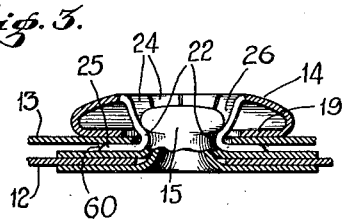
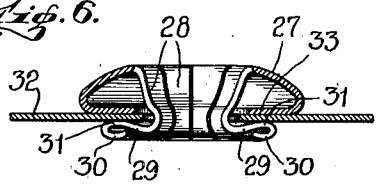
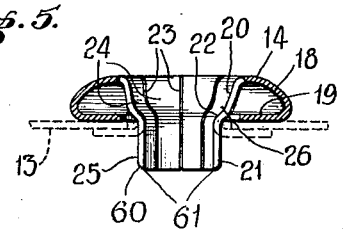
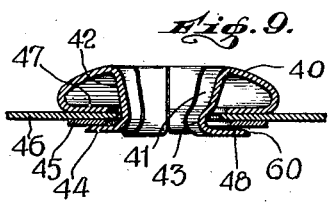
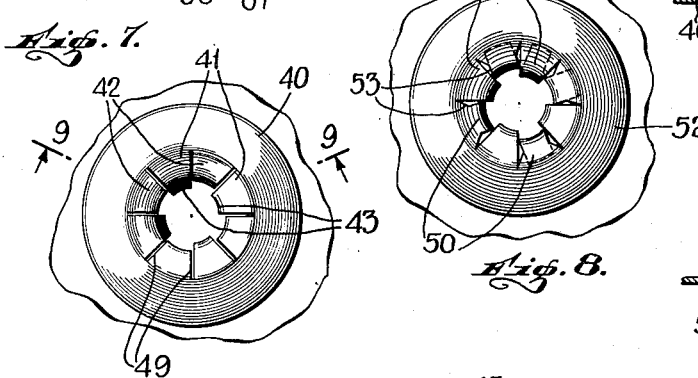
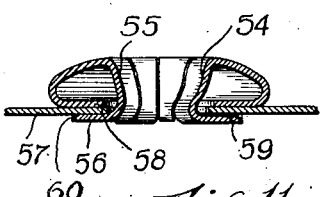
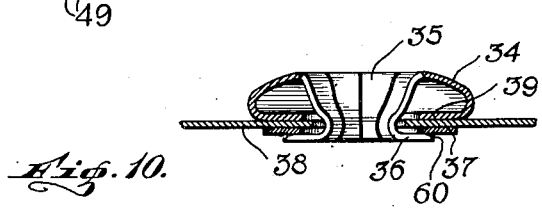
INVENTOR
OTTO J. HUELSTER
BY
Howard E. Thompson
ATTORNEY Patented Nov. 22, 1949

2,489,032

UNITED STATES PATENT OFFICE 2,489,032

ENVELOPE SNAP FASTENER

Otto J. Huelster, Waterbury, Conn., assignor to Scovill Manufacturing Company, Waterbury, Conn., a corporation of Connecticut Application July 22, 1944, Serial No. 546,119½

2 Claims. (Cl. 24—217)

1

This invention relates to snap fasteners adapted for use in connection with such articles as envelopes for use in retaining the flap of the envelope in closed position. More particularly, the invention relates to fasteners of the kind defined wherein the socket part includes a more or less tubular bore severed longitudinally to divide the same into circumferentially arranged spring members adapted to engage the stud of the fastener. Further, the tubular portion of the socket or the spring members thereof have ends employed to retain the socket upon the envelope or other mounting member and, still further, wherein breast portions of the socket includes an inwardly extending annular wall portion forming a backing and support for the envelope or mounting member around the tubular portion of the socket.

The novel features of the invention will be best understood from the following descriptions when taken together with the accompanying drawing, in which certain embodiments of the invention are disclosed, and in which the separate parts are designated by suitable reference characters in each of the views and in which:

Fig. 1 is a face view of one end portion of an envelope showing a flap in closed position and illustrating one of my improved snap fasteners.

Fig. 2 is a view similar to Fig. 1 showing the flap in open position.

Fig. 3 is a partial section on the line 3—3 of Fig. 1 on an enlarged scale.

Fig. 4 is a sectional view through an envelope and the flap portion thereof in alinement with a fastener and showing the fastener in elevation and illustrating the fastener used as a means for attaching a sheet between the flap and envelope proper.

Fig. 5 is a sectional view through a socket member showing the same in a partially formed position and indicating in dotted lines the further shaping of the socket to attach the same to the support in the manner illustrated in Fig. 3 of the drawing.

Fig. 6 is a view similar to Fig. 3 showing only the socket and showing a modified construction.

Figs. 7 and 8 are top plan views of two modified forms of sockets which I employ.

Fig. 9 is a section substantially on the line 9—9 of Fig. 7.

Fig. 10 is a view similar to Fig. 3 showing only the socket and illustrating the use of a washer as taught in Fig. 9; and Fig. 11 is a view similar to Fig. 9 omitting the use of the washer.

2

In fasteners of the type and kind under consideration, difficulties have been experienced in providing socket members in which a free action of the springs or yieldable members of the socket is provided to facilitate coupling and uncoupling of the stud member therewith and, at the same time, insure positive coupling of the separate parts of the fastener to prevent accidental displacement of the members to which the stud and socket parts are attached.

To overcome these problems, I have first constructed a socket member wherein the annular breast portion includes an inwardly directed ring-like supporting and backing wall arranged in close proximity to the central tubular portion of the socket. This central tubular portion is divided into circumferentially arranged spring members having terminal ends extending onto said backing wall for retaining the support between the same and said wall, so as to provide free radial movement of the spring members in the socket and to provide free radial movement of the terminal ends of the spring members over the surface of the support without tendency to mar or injure the support or to weaken the wall structure thereof. In certain adaptations of the invention, the socket also includes a ring-like washer providing a bearing surface on the support, over which the spring members are free to pass. Still further, alternate spring members are so shaped as to provide free passage of the stud head into the socket, thus minimizing the number of spring members engaging the stud head in retaining the same against displacement, whereby the first named members, which in fact are not spring members, are used to firmly and securely grip the support. The stud engaging members, on the other hand, are arranged to move freely over the surface of the support or the washer arranged thereon.

To illustrate one adaptation and use of the invention, I have shown in Figs. 1 and 2 of the drawing an envelope 12 having a closure flap 13, these parts being adapted to be secured together by a socket 14 on the flap and a stud 15 on the body portion of the envelope inwardly of the open end 16 thereof.

The present invention deals primarily with the construction of the socket and, from this standpoint, the particular type and kind of stud employed is of no interest.

In Fig. 4 of the drawing is shown a partial longitudinal section of the envelope shown in Figs. 1 and 2 or a section at right angles to that illustrated in Fig. 3 simply to show the arrangement of a sheet of paper or other material 17 between the flap 13 and body portion 12 of the envelope. The socket is of tubular construction and the stud head, in entering the socket, is used to sever or punch the sheet 17 in coupling the socket 14 with the stud 15 and in attaching the sheet 17 to the envelope. Quite often, it is desirable to attach note sheets to envelopes or, on the other hand, to attach an envelope to a letter or specification sheet and a tubular socket of the kind under consideration will lend itself to this use, in that the punched out material is free to be discharged through the open socket.

The socket 14 is shown in full lines in Fig. 5 in a partially formed position, that is to say, the rounded breast portion 18 includes the inwardly extended annular or ring-like backing wall portion 19 at its periphery and the slightly tapering tubular wall portion 20 which joins a straight wall portion 21 in an inwardly offset or rounded portion 22.

The tubular portion 20 from the early stage, where it joins the breast portion 18 and through the straight end 21, has longitudinally arranged and circumferentially spaced slits 23 dividing the tubular portion into independent spring members 24 having terminal ends 25 which, in attaching the socket to the support or flap 13, are bent outwardly and radially upon the flap and the reinforcing and backing ring 19. This operation forms of the rounded portions 22 the inward and radial stud engaging projections of each of the spring members 24. This construction also provides immediately above the projections 22 a rather large recess 26 diverging outwardly for the reception of the stud head, as clearly seen in Fig. 3 of the drawing. In bending over the terminal ends 25, it is preferred that they are not moved into firm or punching engagement with the support 13, so as to provide slight clearance or a free movement of said ends of the spring members 24 to slide on the support in the operation of moving the stud into and out of the socket. In this operation, the wall 19 provides a backing for the support and aids in maintaining the relationship of the parts one with respect to the other.

In Fig. 6 of the drawing, I have shown a slight modification of the construction shown in Figs. 1-5, inclusive, and, in this figure, the socket 27 differs from the socket 14 solely in the fact that the spring members 28 have terminal coupling ends 29 which are slightly curved and terminate in inturned flanges 30, which provide rounded bearing surfaces 31 for free travelling over the support 32 to which the socket 27 is attached. In Fig. 6, the wall 33 is equivalent to the backing wall 19.

In Fig. 10 of the drawing, I have shown a socket 34 which is substantially identical with the socket 14 shown in Figs. 1-5, inclusive, the only difference being that the spring members 35 have terminal ends 36 which ride upon and are free to move over a washer-like member 37 interposed between the ends 36 and the support 38. The socket 34 has a back wall 39 similar to the wall 19.

In Figs. 7 and 9 is shown a modification of the structure shown in Fig. 10 and differing from the socket of Fig. 10 simply in providing a socket 40 having widely spaced spring members 41 similar to the members 35 and 24 and, between these members are what may be termed gripper or mounting members 42. One of the members 41 is shown at the right of Fig. 9; whereas another member 42 is shown at the left of said figure, the latter member 42 having no inward offset 43 to engage the stud head. In fact, the member 42 has a more or less straight tapered wall and the smallest diameter of this member would provide free passage of the stud head therethrough, so that the sharply curved projections or sections 43 of the members 41 alone operate to retain the stud head against displacement from the socket. With this construction, the terminal ends 44 of the members 42 are firmly clamped upon the washer 45 to securely bind the mounting member 46 between the washer and the backing wall 47; whereas the terminal ends 48 of the members 41 are free to move radially over the washer 41 and this is somewhat exaggerated by the clearance shown between the end 48 and the washer 45 at the right of Fig. 9. Considering Fig. 7 of the drawing, it will also appear that the members 41 and 42 are formed by slits 49 and, in firmly clamping the gripper members 42 in position, the members 41 will have free spring action. The slits will be widened sufficiently to provide free movement of the spring members 42.

In Fig. 8 of the drawing is shown another method of providing clearances between the securing members 50 and the spring members 51 of a socket 52, which is otherwise the same as that shown in Figs. 7 and 9. In other words, the side edges of the members 50 have V-shaped notches 53 which will widely space adjacent edge portions of the members 50 and 51.

The structure shown in Fig. 11 is the same as that of Fig. 9 simply omitting the washer 45. In other words, in Fig. 11 the member 54 is equivalent to the member 41 and the member 55 equivalent to the member 42. The terminal end 56 of the member 55 will directly and firmly secure the support 57 upon the backing wall 58; whereas the terminal end 59 will freely pass over the support 57.

The structures shown in Figs. 7, 8, 9 and 11 are desirable for use, particularly on certain types of supports wherein it is desired to firmly and positively retain the socket against any movement relatively to the support. This is accomplished by the members 42, 50 and 55. With this type of construction, the spring members engaged by the stud can be made to freely move over the support or over a washer-like member arranged on the support. This type of construction will avoid the possibility of destroying the support and thus loosening or freeing the socket therefrom. It will be noted that, in all instances, the breast portion of the socket joins the reinforcing and backing wall in the rounded wall portion, as clearly illustrated in the cross-sectional views, Figs. 3, 5, 6, 9, 10 and 11. This construction also avoids rupturing of the closure flap in pulling on this flap to separate the socket and stud parts.

It will also be apparent that, with structures of the type and kind shown in the latter figures and particularly apparent from a consideration of Figs. 7 and 8 of the drawing, by minimizing the number of the spring members engaging the stud head, a free action is provided between the stud and socket parts both in coupling and uncoupling the parts; whereas the parts are held against accidental separation. By free action, it is meant that the commonly experienced binding action, which often times results in tearing or rupturing the support, is obviated.

In the accompanying drawing, the slits, as at 23 Fig. 5 of the drawing, are shown for sake of clarity more as slots in order to clearly indicate sub-divisions of the members 24 and this is also true in the other illustrations. It will also appear from a consideration of Figs. 3, 5, 9, 10 and 11, that the ends of the separate members forming the tubular structure of the sockets are rounded, as seen at 60 and, in considering Fig. 5, which shows the socket 14 in its initial form prior to assemblage with the support, the rounded portion, as at 60, forms at the inner surface of the straight end 21 a sharp edge 61, which can be used to pierce or punch out the support in mounting the socket part on the support, thus producing of the socket a self-piercing property which is advantageous, particularly with some mountings of the kind illustrated. It will be apparent, however, that in some instances, an aperture may be formed in the support to receive the socket part and in the various assemblages illustrated in the drawing, pre-formed apertures are shown in the support for the socket rather than apertures pierced by the socket member, as stated above. It will also be understood that the rounded portion, as at 60, facilitates freer movement of the spring members relatively to the support in coupling and uncoupling a stud with the socket.

While the invention has been disclosed for illustrative purposes as adaptable for use as an envelope fastener, it will, of course, be apparent that the socket member can be attached to supports of any type and kind or used wherever fasteners of the general kind under consideration can be used and this is particularly true with devices of the type and kind disclosed in Figs. 7, 8, 9 and 11 where the spring members may be left to clear the support sufficiently for free action.

It will also be apparent that, while in many instances, the socket members will be composed of metal and will be used in conjunction with metallic structures, the structure may be composed of plastic material as well as the socket parts of the fastener. When plastics are used, the final forming operation, as indicated in Fig. 5 of the drawing, would be performed after heating the tubular portions of the socket sufficiently to provide free bending or reshaping thereof to secure the socket to the support.

It will be understood that the socket, in the form illustrated in full lines in Fig. 5 of the drawing, constitutes an article of manufacture and can be sold as such for attachment to envelopes or other supports. In other words, articles in this form may be sold in bulk to various manufacturers who would have suitable tools or equipment to turn or rivet over the tubular portion of the socket in attaching the same to the support.

Having fully described my invention what I claim as new and desire to secure by Letters Patent is:

1. A fastener socket installation comprising, in combination, a support, a rounded breast portion, an annular flange formed inwardly from the outer circumference of said breast portion, said flange surrounding a central opening and resting directly against one surface of said support, a tapered tubular wall portion having its larger end integral with the upper inner end of said breast portion and its opposite end merged into a cylindrical wall portion, said tapering portion and said cylindrical portion being slit throughout their entire length to provide several circumferentially arranged spring fingers that project downwardly through said flange opening, said fingers being in spaced relation to the flange to allow free radial movement of the fingers, the finger sections forming the cylindrical portion being inserted through said support and bent outwardly into proximity with said flange so that the end portions of the fingers bear directly against the opposite surface of said support holding the socket in assembled relation with said support while providing for free radial movement of said end portions over the surface of the support, and the small end of said tubular portion forming a resilient restricted aperture adapted to engage a stud part of a complemental fastener member.

2. A fastener socket installation comprising, in combination, a support, a rounded breast portion, an annular flange formed inwardly from the outer circumference of said breast portion, said flange surrounding a central opening and resting directly against one surface of said support, a plurality of circumferentially arranged spring fingers integral with the upper edge of said breast portion and extending downwardly through said flange opening with their lower ends bent outwardly into engagement with the opposite surface of said support for holding said socket assembled to said support, said central flange opening being large enough to allow radial movement of said fingers relative thereto and providing for free radial movement of the terminal ends of the spring fingers over the surface of said support, and portions of said fingers being formed into a constricted aperture for detachable engagement with a stud part of a complemental fastener member.

OTTO J. HUELSTER.

REFERENCES CITED

The following references are of record in the file of this patent:

UNITED STATES PATENTS

| Number | Name | Date |
| --- | --- | --- |
| 400,865 | Mandrill | Apr. 2, 1889 |
| 617,269 | Adams | Jan. 3, 1899 |
| 749,639 | Sternberg | Jan. 12, 1904 |
| 1,044,111 | Williams | Nov. 12, 1912 |
| 1,088,981 | Greenebaum | Mar. 3, 1914 |
| 1,796,525 | Johnson | Mar. 17, 1931 |
| 1,848,580 | Simons | Mar. 8, 1932 |